(12) United States Patent
Li et al.

(10) Patent No.: US 11,795,265 B2
(45) Date of Patent: Oct. 24, 2023

(54) MACROMONOMERIC STABILIZER, PREPARATION METHOD THEREOF, AND METHOD FOR PREPARING POLYMERIC POLYOL

(71) Applicant: WANHUA CHEMICAL GROUP CO., LTD., Shandong (CN)

(72) Inventors: Fuguo Li, Shandong (CN); Changxun Ju, Shandong (CN); Yang Liu, Shandong (CN); Chengqun Qin, Shandong (CN); Bin Liu, Shandong (CN); Xunkun Wu, Shandong (CN); Jing Li, Shandong (CN); Ye Sun, Shandong (CN); Bing Zheng, Shandong (CN); Lunpeng Wang, Shandong (CN)

(73) Assignee: WANHUA CHEMICAL GROUP CO., LTD., Shandong (CN)

( * ) Notice: Subject to any disclaimer, the term of this patent is extended or adjusted under 35 U.S.C. 154(b) by 169 days.

(21) Appl. No.: 17/295,581

(22) PCT Filed: Dec. 26, 2018

(86) PCT No.: PCT/CN2018/123892
§ 371 (c)(1),
(2) Date: May 20, 2021

(87) PCT Pub. No.: WO2020/132940
PCT Pub. Date: Jul. 2, 2020

(65) Prior Publication Data
US 2022/0017682 A1  Jan. 20, 2022

(51) Int. Cl.
C08F 290/06 (2006.01)
C08G 18/48 (2006.01)
C08G 18/63 (2006.01)
C08G 65/26 (2006.01)
C08J 9/00 (2006.01)

(52) U.S. Cl.
CPC ....... C08G 18/632 (2013.01); C08G 18/4829 (2013.01); C08G 65/2615 (2013.01); C08G 65/2696 (2013.01); C08J 9/0061 (2013.01); C08J 2205/06 (2013.01); C08J 2375/08 (2013.01)

(58) Field of Classification Search
CPC .................................................. C08G 65/2615
See application file for complete search history.

(56) References Cited

U.S. PATENT DOCUMENTS

| | | | |
|---|---|---|---|
| 3,652,639 A | 3/1972 | Pizzini et al. | |
| 3,823,201 A | 7/1974 | Pizzini et al. | |
| 3,932,356 A * | 1/1976 | Takagi | C08G 63/668 528/304 |
| 4,652,589 A * | 3/1987 | Simroth | C08F 283/06 521/137 |
| 4,659,778 A * | 4/1987 | Williams | C08G 63/58 528/297 |
| 5,834,118 A * | 11/1998 | Rånby | C08G 63/20 528/297 |
| 5,863,980 A * | 1/1999 | Choi | C08G 18/10 528/80 |
| 6,403,667 B1 * | 6/2002 | Eleveld | C08G 18/635 525/445 |
| 2008/0262119 A1 * | 10/2008 | Bouwman | C08F 283/06 521/137 |
| 2013/0131204 A1 * | 5/2013 | Fennis | C08G 65/34 528/392 |
| 2013/0131205 A1 * | 5/2013 | Fennis | C08G 18/632 528/392 |
| 2021/0355263 A1 * | 11/2021 | Li | C08G 18/1808 |
| 2022/0017448 A1 * | 1/2022 | Li | C08G 18/244 |

FOREIGN PATENT DOCUMENTS

| | | | |
|---|---|---|---|
| CA | 2801876 A1 | 12/2011 | |
| CN | 1354764 A | 6/2002 | |
| CN | 101657485 A | 2/2010 | |
| CN | 102482411 A | 5/2012 | |
| CN | 102858833 A | 1/2013 | |
| CN | 103068866 A | 4/2013 | |
| CN | 107090064 A | 8/2017 | |
| EP | 1028133 A1 | 8/2000 | |
| WO | WO-9420558 A1 * | 9/1994 | C08G 18/08 |

(Continued)

OTHER PUBLICATIONS

International Search Report issued in PCT/CN2018/123892 dated Oct. 8, 2019.

(Continued)

Primary Examiner — Melissa A Rioja
(74) Attorney, Agent, or Firm — Norton Rose Fulbright US LLP; James R. Crawford

(57) ABSTRACT

A macromonomeric stabilizer, a preparation method thereof, a method for preparing a polymeric polyol using same, and the polymeric polyol prepared. Also disclosed are a soft polyurethane foam obtained by foaming a composition of the polymeric polyol prepared and a polyisocyanate, and a molded product comprising the soft polyurethane foam. The preparation method of the macromonomeric stabilizer comprises the following steps: reacting a polyol with a tricarboxylate not comprising a polymerizable ethylenically unsaturated double bond, or a derivative thereof, to form an adduct; and reacting the resulting adduct with an epoxide comprising a polymerizable ethylenically unsaturated double bond. The macromonomeric stabilizer of the present invention has a low viscosity, comprises a plurality of active sites, and can be directly used in subsequent reactions. The preparation method of the macromonomeric stabilizer can be carried out under normal pressure, without the need for end-blocking with ethylene oxide.

18 Claims, 2 Drawing Sheets

(56) References Cited

FOREIGN PATENT DOCUMENTS

| | | |
|---|---|---|
| WO | 2008122581 A1 | 10/2008 |
| WO | 2012017016 A1 | 2/2012 |
| WO | 2014137656 A1 | 9/2014 |

OTHER PUBLICATIONS

Office Action dated Jan. 28, 2022 by the CIPO in the corresponding Patent Application No. 201811601416.3, with English translation.
European Search Report dated Jun. 15, 2022 in a corresponding patent application No. 18944855.8-1102.

* cited by examiner

MACROMONOMERIC STABILIZER, PREPARATION METHOD THEREOF, AND METHOD FOR PREPARING POLYMERIC POLYOL

CROSS REFERENCE TO RELATED APPLICATIONS

This application is a national phase under 35 U.S.C. § 371 of International Application No. PCT/CN2018/123892 filed on Dec. 26, 2018, which is hereby incorporated by reference in its entirety.

TECHNICAL FIELD

The present disclosure belongs to the chemical industry field, relates to a macromonomeric stabilizer, a preparation method thereof, and a method for preparing a polymeric polyol using the same, and more particularly, relates to a macromonomeric stabilizer having a multi-active-site anchoring function, a preparation method thereof, and a method for preparing a polymeric polyol using the same.

BACKGROUND

The polyurethane foam is formed by reacting a polyisocyanate and a polyol and/or a polymeric polyol and foaming in the presence of a foaming agent, which is known in the art, as described in Chapter 6 of *Polyurethane Foams* (3rd edition) published in 2005 by Chemical Industry Press. To improve the load-carrying and other properties of the polyurethane foam, various modified polyol products and modified polymeric polyol products have been developed. Commonly used modified polyol products and modified polymeric polyol products include dispersions of polymeric particles in polyols, such as dispersions of vinyl polymer particles in polyols or polymeric polyols (for example, dispersions of styrene/acrylonitrile copolymers in polyols or polymeric polyols), dispersions of polyurea particles in polyols or polymeric polyols (polyurea polyols), and polyisocyanate addition polymers (dispersions of polyurethane-polyurea particles in PIPA polyols). For such products, currently, commercially available ones are dispersions of styrene/acrylonitrile copolymers in polyols or polymeric polyols.

There are numerous methods known in the art for preparing a polymeric polyol. These methods are generally carried out by using the unsaturation inherent in the polyoxyalkylene polyol forming the dispersion, or by introducing a small amount of unsaturation into the polyol. As described in the U.S. Pat. No. 3,652,639, the copolymer polyol which is prepared by reacting maleic anhydride with a polyether polyol and introducing a double bond has a relatively large viscosity of about 5700 cp at a solid content of 11%. U.S. Pat. No. 3,823,201 also discloses reaction of maleic anhydride with a polyether polyol at a high temperature of 150° C. to 175° C., which inevitably leads to the reduction of functionality and the increase of by-products regardless of the nitrogen protection.

Therefore, there is a need to find other macromolecular monomer stabilizers and other methods of preparing a copolymer polyol to solve the above problems in the existing art.

SUMMARY

The present disclosure provides a macromonomeric stabilizer, a preparation method thereof, and a method for preparing a polymeric polyol using the same. The present disclosure further relates to a flexible polyurethane foam obtained by foaming a composition of the polymeric polyol prepared and a polyisocyanate, and a molded product including flexible polyurethane foam. The present disclosure mainly provides a macromonomeric stabilizer having a multi-active-site anchoring function (that is, an ability to form a grafting polymer), a preparation method thereof, and a method for preparing a polymeric polyol using the same.

The present disclosure provides a preparation method of a macromonomeric stabilizer, comprising the following steps:
  reacting a polyol with a tricarboxylic acid not including a polymerizable olefinic unsaturated double bond, or a derivative thereof, to form an adduct; and
  reacting the resulting adduct with an epoxide including a polymerizable olefinic unsaturated double bond.

Preferably, the structure formula of the tricarboxylic acid not including a polymerizable olefinic unsaturated double bond or the derivative thereof is

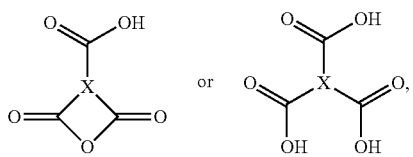

wherein X is a straight or branched alkane segment having 1 to 25 carbons, a cycloalkane segment having a total of 3 to 25 carbons or a straight or branched alkane segment containing cycloalkyl and having a total of 4 to 25 carbons or a cycloalkane segment substituted with straight or branched alkyl and having a total of 4 to 25 carbons, or an aromatic hydrocarbon segment having a total of 6 to 25 carbons or a straight or branched alkane segment containing aryl and having a total of 7 to 25 carbons or an aromatic hydrocarbon segment substituted with straight or branched alkyl and having a total of 7 to 25 carbons, and X does not include a polymerizable olefinic unsaturated double bond.

The straight or branched alkane segment having 1 to 25 carbons refers to a carbon chain of the general formula of $CnH_{2n-1}$, wherein n is 1 to 25;
  the general formula of the cycloalkane segment having a total of 3 to 25 carbons is $C_mH_{2m-3}$, wherein n is 3 to 25;
  the straight or branched alkane segment containing cycloalkyl and having a total of 4 to 25 carbons refers to a structure in which the hydrogen of a carbon chain of the general formula of $C_pH_{2p-1}$ is substituted with one or more cycloalkyl groups, and the structure includes a total of 4 to 25 carbons;
  the general formula of the cycloalkane segment substituted with straight or branched alkyl and having a total of 4 to 25 carbons is $C_qH_{2q-3}$, in which at least one hydrogen is substituted with the straight or branched alkyl, and the structure includes a total of 4 to 25 carbons;
  the general formula of the aromatic hydrocarbon segment having a total of 6 to 25 carbons is $C_rH_{2r-9}$, wherein r is 6 to 25;
  the straight or branched alkane segment containing aryl and having a total of 7 to 25 carbons refers to a structure in which a hydrogen of the carbon chain having a general formula of $C_sH_{2s-1}$ is substituted with one or more aryl groups, and the structure includes a total of 7 to 25 carbons;

the general formula of the aromatic hydrocarbon segment substituted with straight or branched alkyl and having a total of 7 to 25 carbons is $C_tH_{2t-9}$, in which at least one hydrogen is substituted with straight or branched alkyl, and the structure includes a total of 7 to 25 carbons.

The cycloalkane refers to saturated monocyclic, fused, bridged, or spirocyclic alkane, in which none of the rings has a fully conjugated π-electron aromatic system.

Preferably, the tricarboxylic acid not including a polymerizable olefinic unsaturated double bond or the derivative thereof is trimesic acid

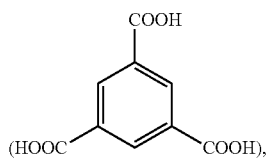

trimellitic anhydride

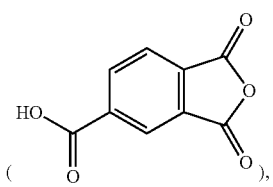 [SMILES: O=C(O)c1ccc2c(c1)C(=O)OC2=O]

or hydrogenated maleopimaric acid

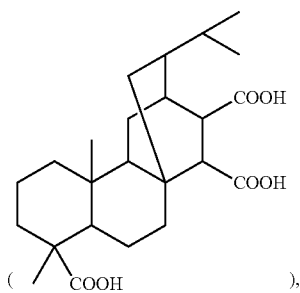 [SMILES: CC(C)C1CC23CCC4C(C)(C(=O)O)CCCC4(C)C2CC1C(C(=O)O)C3C(=O)O]

preferably trimellitic anhydride.

Preferably, the polyol is a polyether polyol, preferably a polyether polyol having a number average molecular weight of 2500 to 15000 daltons and an average functionality of at least 2.0, more preferably a polyether polyol having a number average molecular weight of 5000 to 14000 daltons and an average functionality of 2.5 to 6.0.

The preparation process of the polyether polyol is described in detail in p. 55-91 of *Handbook of Polyurethane Materials* published by Chemical Industry Press, 2002. It is well known in the art that the molecular weight can be calculated from the hydroxyl value and functionality and that the functionality and hydroxyl value can be known according to the initiator, the testing and calculation of which are detailed in p. 88-106 of *Polyurethane and Its Raw Materials Analysis* published by Arms Industry Press, 1991.

The polyether polyol, also called polyoxyalkylene polyol, is obtained by reacting starting agents having an active hydrogen atom with one or more epoxy compounds, wherein the epoxy compounds are, for example, one or more of ethylene oxide, propylene oxide, and butylene oxide.

Preferably, the epoxide including a polymerizable olefinic unsaturated double bond is one or more of 1,2-epoxides including a polymerizable olefinic unsaturated double bond, having a structure formula of

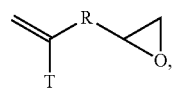

wherein R is selected from $R_1$—COO—$R_2$, $R_3$—O—$R_4$, or straight or branched alkyl having 1 to 4 carbons, wherein $R_1$, $R_2$, $R_3$, and $R_4$ are each independently selected from H, or straight or branched alkyl having 1 to 4 carbons;

T is selected from H, cyano, or branched or straight alkyl having 1 to 4 carbons.

Preferably, the epoxide including a polymerizable olefinic unsaturated double bond is one or more of glycidyl ether or glycidyl acrylate and derivatives thereof, more preferably one or more of allyl glycidyl ether, glycidyl methacrylate, or glycidyl acrylate, particularly preferably glycidyl methacrylate.

In the preparation method of the macromonomeric stabilizer provided by the present disclosure, the molar ratio of the polyol to the tricarboxylic acid not including a polymerizable olefinic unsaturated double bond or the derivative thereof is 0.2:1 to 4:1, preferably 0.5:1 to 1.5:1.

Preferably, the molar ratio of the tricarboxylic acid not including a polymerizable olefinic unsaturated double bond or the derivative thereof to the epoxide is 0.1:1 to 2:1, preferably 0.3:1 to 1:1.

In the method, the reaction of forming the adduct is carried out in the presence or absence of a catalyst, preferably in the presence of the catalyst. Preferably, the catalyst is a Lewis acid or an alkali metal oxide, an alkali metal hydroxide, an alkaline earth metal oxide, or an alkaline earth metal hydroxide; and the amount of the catalyst is 0.001% to 0.5% of the mass of the polyol.

Preferably, the reaction of forming the adduct is carried out at 60° C. to 150° C., more preferably at 80° C. to 130° C.;

preferably, the reaction of forming the adduct is carried out at a pressure of 0 to 2 bar, preferably at atmospheric pressure.

In the method, the reaction between the adduct and the epoxide including a polymerizable olefinic unsaturated double bond is carried out in the presence or absence of a catalyst, preferably in the presence of the catalyst. Preferably, the catalyst is one or more of an organic phosphine catalyst and an organic amine catalyst; and the amount of the catalyst is 0.001% to 0.5% of the mass of the polyol.

the organic phosphine catalyst is preferably an organic phosphine halide or an organic phosphine hydroxide;

the organic phosphine halide is preferably one or more of tetramethylphosphonium iodide, tetramethylphosphonium bromide, trimethylbenzylphosphonium bromide, trimethylbenzylphosphonium chloride, ethyltriphenylphosphonium iodide, ethyltri(p-tolyl)phosphonium bromide, ethyltri(p-tolyl)phosphonium chloride, and tetrabutyl phosphonium bromide;

the organic phosphine hydroxide is preferably one or more of tetramethylphosphonium hydroxide, tetramethylphosphonium hydroxide, trimethylbenzylphosphonium hydroxide, ethyl triphenylphosphonium hydroxide, ethyltri(p-tolyl)phosphonium hydroxide, tetraethylphosphonium hydroxide, and tetrabutylphosphonium hydroxide;

the organic amine catalyst is preferably imidazole and derivatives thereof, secondary amine, or tertiary amine, wherein the secondary amine is preferably diethylenetriamine, and the tertiary amine is preferably triethylamine, tripropylamine, or tributylamine;

preferably, the reaction between the adduct and the epoxide including a polymerizable olefinic unsaturated double bond is carried out at 70° C. to 160° C., more preferably at 90° C. to 140° C.;

preferably, the reaction between the adduct and the epoxide including a polymerizable olefinic unsaturated double bond is carried out at a pressure of 0 to 2 bar, preferably at atmospheric pressure.

In the method, the reaction between the polyol and the tricarboxylic acid not including a polymerizable olefinic unsaturated double bond or the derivative thereof is carried out in a solvent-containing system or a solvent-free system.

The solvent in the solvent-containing system is preferably a polar solvent free of protons, preferably a solvent capable of dissolving the tricarboxylic acid not including a polymerizable olefinic unsaturated double bond or the derivative thereof and the epoxide including a polymerizable olefinic unsaturated double bond. The solvent in the solvent-containing system is preferably acetone, tetrahydrofuran, or methyl ethyl ketone.

The solvent in the solvent-containing system does not participate in the preparation reaction of the macromonomeric stabilizer. In the synthesis reaction of preparing the polymeric polyol from the macromonomeric stabilizer, a solvent may also be used but does not participate in the preparation reaction of the polymeric polyol. In the preparation of the polymeric polyol, the solvent may remain in the reaction system, or may be removed at any reaction stage.

In the preparation method of the macromonomeric stabilizer provided by the present disclosure, a polymerization inhibitor is optionally added. In one embodiment, the polymerization inhibitor includes, but is not limited to, one or more of hydroquinone, p-t-butylcatechol, p-hydroxyanisole, methylhydroquinone, phenothiazine, and diphenylamine. The amount of the polymerization inhibitor is 0% (w/w) to 1.5% (w/w) of the mass of the polyol, preferably 30 ppm to 2000 ppm.

The present disclosure further provides the macromonomeric stabilizer prepared by the above method.

The present disclosure further provides a method for preparing a polymeric polyol using the macromonomeric stabilizer, comprising the following steps: polymerizing at least one olefinic unsaturated monomer in the presence of a base polyether polyol, a polymerization initiator, and the macromonomeric stabilizer.

Preferably, the olefinic unsaturated monomer is one or more selected from aliphatic conjugated diene, a vinyl aromatic compound, α,β-olefinic unsaturated nitrile, α,β-olefinic unsaturated nitrile amide, α,β-olefinic unsaturated carboxylic acid, α,β-olefinic unsaturated carboxylate, vinyl ester, vinyl ether, vinyl ketone, a vinyl halide, and a vinylidene halide; preferably one or more of a vinyl aromatic compound and α,β-olefinic unsaturated nitrile; more preferably a composition of styrene and acrylonitrile, particularly preferably a composition of styrene and acrylonitrile in a mass radio of 10:90 to 90:10, and most preferably a composition of styrene and acrylonitrile in a mass ratio of 60:40 to 90:10.

The olefinic unsaturated monomer used in the present disclosure includes, but is not limited to, all vinyl monomers suitable for preparing polymeric polyols.

Preferably, the mass of the olefinic unsaturated monomer is 20% (w/w) to 70% (w/w) of the total mass of the base polyether polyol, the olefinic unsaturated monomer, and the macromonomeric stabilizer.

Preferably, the mass ratio of the olefinic unsaturated monomer to the base polyether polyol is 0.1% to 250%, preferably 30% to 140%.

The base polyether polyol may be any commercially available polyether polyol for polyurethane systems, including WANOL® F3156, WANOL® F3135, WANOL® F3056, and WANOL® F3128. The base polyether polyol may be the same as or different from the polyether polyol used for preparing the macromonomeric stabilizer.

Preferably, the base polyether polyol is a trifunctional polyether polyol having a hydroxyl value of 10 mgKOH/g to 60 mgKOH/g.

In the present disclosure, the base polyether polyol is selected according to the end use of the polymeric polyol. For example, if the polymeric polyol is used in the production of block polyurethane foam, a polyether polyol for general-purpose polyurethane foam is selected to be used, which is generally a trifunctional base polyether polyol with a hydroxyl value of 54 mgKOH/g to 58 mgKOH/g; if the polymeric polyol is used in the production of high resilient foam, a polyether polyol for high resilient foam is selected to be used, which is generally a trifunctional base polyether polyol with a hydroxyl value of 33.5 mgKOH/g to 36.5 mgKOH/g.

In the method for preparing the polymeric polyol, by mass, the amount of the macromonomeric stabilizer is 0.3% (w/w) to 10% (w/w), preferably 2% (w/w) to 5% (w/w) of the total mass of the base polyether polyol and the olefinic unsaturated monomer.

In the present disclosure, the polymerization of the olefinic unsaturated monomer is carried out in the presence of an initiator. The amount of the initiator is 0.01% (w/w)% (w/w) to 5 wt % of the total mass of the base polyether polyol and the olefinic unsaturated monomer. The preferred initiator is known in the art, including peroxides and azo-compounds. The peroxides are, for example, dibenzoyl peroxide, lauroyl peroxide, tert-butyl hydroperoxide, benzoyl peroxide, and di-tert-butyl peroxide. The azocompounds are, for example, azobisisobutyronitrile (AIBN), azoisovaleronitrile (AMBN), and dimethyl azobisisobutyrate (V601).

In the present disclosure, the polymerization of the olefinic unsaturated monomer is preferably carried out in the presence of a chain-transfer agent. The amount of the chain-transfer agent is 0.01% (w/w)% (w/w) to 6% (w/w), preferably 0.2% (w/w)% (w/w) to 5% (w/w) of the total mass of the base polyether polyol and the olefinic unsaturated monomer. The chain-transfer agent is preferably one or more of 1-butanol, 2-butanol, isopropanol, ethanol, methanol, water, cyclohexane, and thiols, such as one or more of dodecanethiol, ethanethiol, 1-heptanethiol, 2-octanethiol, and toluenethiol.

In one embodiment of the present disclosure, other compounds may also be added in the method for preparing the polymeric polyol, such as compounds that promote the mixing of components, compounds that have an effect of reducing the viscosity, and/or compounds that can enable one or more of components used to be better dissolved in the reaction medium. The compound having the effect of reducing the viscosity and thus enabling the components to be better mixed, for example, is toluene or dichloromethane.

In the present disclosure, the preparation process of the polymeric polyol may be carried out in a batch operation or a continuous operation.

In the present disclosure, the unreacted olefinic unsaturated monomer and the chain-transfer agent in the prepared polymeric polyol generally need to be subjected to the removal treatment. The common removal treatment in the art includes chemical unit operations such as distillation, flash distillation, scraper, or thin-film distillation. These removal treatments are generally carried out at an elevated temperature at a certain vacuum degree. Preferably, the pressure is 0 to 0.3 bar, and the temperature reaches 90° C. to 170° C.

The present disclosure further provides the polymeric polyol prepared by the above method.

The polymeric polyol provided by the present disclosure is extremely suitable for the synthesis of polyurethane foams. The present disclosure also relates to a flexible polyurethane foam obtained by foaming a composition of the polymeric polyol and a polyisocyanate.

The preparation method of the flexible polyurethane foam is known in the art. The flexible polyurethane foam is obtained reacting a polyurethane catalyst, a crosslinking agent, a foaming agent, a foam stabilizer, an auxiliary, and a polyisocyanate.

In the present disclosure, the polyurethane catalyst is preferably an organometallic compound such as stannous octoate, stannous oleate, dibutyltin dilaurate, dibutyltin acetate, and dibutyltin diacetate; and an organic amine catalyst such as bis(2,2'-dimethylamino)ethyl ether, trimethylamine, triethylamine, triethylenediamine, and dimethylethanolamine. The foaming agent is preferably water, acetone, carbon dioxide, halogenated hydrocarbons, aliphatic alkanes, and alicyclic alkanes. The foam stabilizer is preferably an organopolysiloxane surfactant. In addition, flame retardants, fillers, light stabilizers, and antioxidants are also used in the preparation method of flexible polyurethane foam.

The last aspect of the present disclosure relates to a molded product including the flexible polyurethane foam described above.

In the art:

The polymeric polyol (also called copolymer polyol) refers to a dispersion consisting of continuous phases and solid discontinuous phases dispersed therein, wherein the continuous phase is a base polyether polyol consisting of one or more compounds containing a plurality of hydroxyl groups, and the solid discontinuous phases are solid polymeric particles. The polymeric polyol is prepared by forming dispersions directly in the base polyether polyol continuous phases by polymerizing the polymerizable olefinic unsaturated double bond compounds.

The polymerizable olefinic unsaturated double bond compound (also called olefinic unsaturated monomer) refers to a monomer or compound containing an ethylenic double bond (>C=C<), is capable of carrying out the addition polymerization reaction initiated by free radical, and is preferably a vinyl monomer suitable for preparing a polymeric polyol, such as styrene or derivative thereof, α,β-unsaturated aldehyde, ketone, acid, ester, or amide and derivatives thereof.

The macromonomeric stabilizer refers to a compound whose molecule includes a polymerizable double bond and one or more polyol chain segments, in which the double bond can be copolymerized with an olefinic unsaturated monomer and thus becomes part of the polymer chain. The polyol chain ends extending from the polymer chain may be compatible with the liquid polyol medium of the dispersion in the polymer chain to stabilize the dispersed polymer.

The base polyether polyol is used for synthesizing the polymeric polyol and may be any polyether polyol used in the polyurethane system.

The present disclosure has the following beneficial effects:

1. The preparation method of the macromonomeric stabilizer provided by the present disclosure is carried out at atmospheric pressure and does not use ethylene oxide to block; however, the method in the existing art, such as those mentioned in U.S. Pat. Nos. 3,652,639 and 3,823,201, need to be carried out at high pressure and require ethylene oxide for end-blocking.

2. The macromonomeric stabilizer provided by the present disclosure does not need to be refined or isolated and can be used directly in subsequent reactions.

3. The macromonomeric stabilizer prepared by the tricarboxylic acid not including a polymerizable olefinic unsaturated double bond or a derivative thereof (in particular those with the structure of

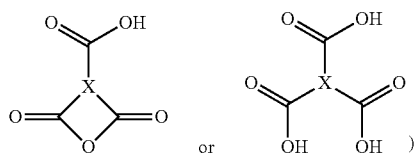

and the epoxide including a polymerizable olefinic unsaturated double bond (in particular those with the structure of

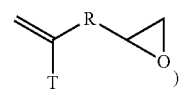

may be less viscous than the macromonomeric stabilizer prepared by the prior art method with the same polyols, and is more easily mixed with the materials in the polymerization reaction system.

4. The macromonomeric stabilizer provided by the present disclosure contains multiple active sites, and the synthesized polymeric polyol by using the macromonomeric stabilizer has better thermal stability than the polymeric polyol synthesized by the method in the existing art and shows no significant change in particle appearance during high temperature storage or VOC removal. The significantly improved thermal stability of the macromonomeric stabilizer provided by the present disclosure is particularly advantageous for the preparation of polymeric polyols with ultra-low volatile organic compound content since the process for the preparation of the polymeric polyol using the macromonomeric stabilizer provided by the present disclosure can remove olefinic unsaturated monomers and chain-transfer agents at higher temperatures than the existing methods, without increasing the viscosity of the prepared polymeric polyol.

DETAILED DESCRIPTION

Figure 1:
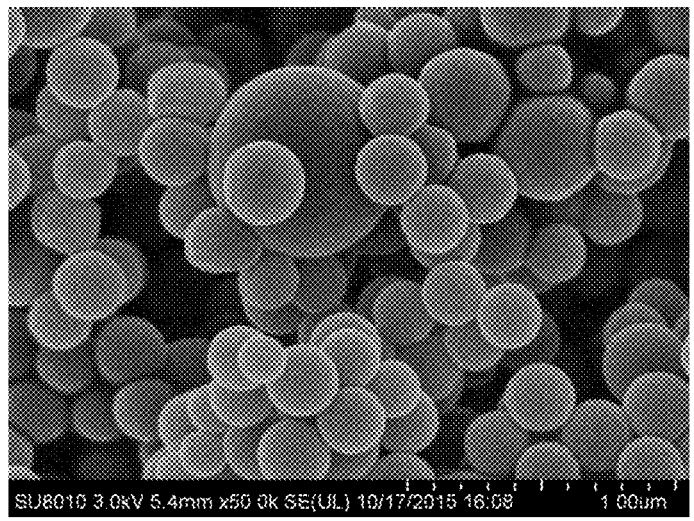
FIG. 1 is the SEM image of the polymeric polyol 1 prepared in Example 4.

The present disclosure will be further described hereinafter in conjunction of the specific examples. It is to be understood that the examples described below are intended to be illustrative only and are not intended to limit the scope of the present disclosure.

The materials and reagent used in the following examples of the present disclosure are sourced as follows:

Trimellitic anhydride: Shandong Xiya Chemical Industry Co., Ltd., analytical pure.

Hydrogenated maleopimaric acid: self-made, 62.5 g of Pinus massoniana rosin containing 80% abietic acid (purchased from Shanghai Sanlian Industry), 30 ml of acetic acid, and 10.2 g of maleic anhydride were mixed and then reacted. The reaction was refluxed at 110° C. for 4 hours. After the reaction was cooled, the resultant product was washed twice with acetic acid and then three times with distilled water at 80° C., filtered, and dried to obtain maleopimaric acid anhydride in a yield of 62.5%. The obtained product was redissolved in 200 ml of ethanol and catalyzed for 3.5 hours in the presence of 4 g of 5% (w/w) palladium on carbon catalyst at 65±1.5° C. under 0.45 Mpa hydrogen atmosphere. After the reaction was cooled, the filtrate was concentrated to dryness, with a yield of 92.7%.

Trimesic acid: Shanghai Macklin Biochemical Co., Ltd, analytical pure

Isopropanol: Shangdong Dadi Huapu Chemical Co., Ltd., industrial grade.

Acrylonitrile: Shanghai SECCO, industrial grade

Styrene: Tianjin Dagu Chemical Co., Ltd., industrial grade.

Azobisisobutyronitrile: Shangdong Haiming Chemical Co., Ltd., industrial grade.

Base polyether polyol: common flexible foam polyether polyol prepared by reacting glycerol with propylene oxide and ethylene oxide, Wanhua Chemical Group Co., Ltd., WANOL® F3156.

Other raw materials involved in the following examples were purchased from Aladdin Biochemical Technology Co., Ltd, if not specified otherwise.

The test method used in the present disclosure is as follows:

Hydroxyl value: GB 12008.3-2009 Plastics—Polyether Polyols—Part 3: Determination of hydroxyl value Viscosity: GB 12008.7-2010 Plastics—Polyether Polyols—Part 7: Determination of viscosity Solid content: GB/T 31062-2014 Polymeric Polyol The following examples were carried out under the protection of nitrogen if not specified otherwise.

EXAMPLE 1

Preparation of Polyether Polyol 1

The specific preparation is described in CN107090064A.

In a reaction kettle, sorbitol was added as an initiator, the catalyst (KOH) which was 0.3% (w/w) of the mass of propylene oxide (PO) designed to be added was added, the reaction temperature was controlled to be about 110±5° C., the pressure was controlled to be lower than 0.15 MPa, the PO was fed, and the reaction was then carried out. After the completion of the PO feeding, the reaction continued for 2 hours, and the unreacted PO was removed for 1 hour. After the completion of degassing, ethylene oxide (EO) was fed, and with the reaction temperature controlled at about 110±5° C. and the pressure controlled to be lower than 0.15 MPa, the reaction was carried out. After the completion of material feeding, the reaction was continued for 2 hours, and unreacted EO was removed for 1 hour. At this time, the reaction stage ended. With the temperature controlled to be at 85° C. to 90° C., soft water and phosphoric acid were added to neutralize the reaction product, and the neutralized product was dehydrated, filtered, and cooled to obtain the polyether polyol 1. In this example, the mass ratio of sorbitol/EO/PO was 1.08/4.95/93.97. The hydroxyl value of the obtained polyether polyol 1 was measured to be about 28 mgKOH/g, and the molecular weight was about 12000 daltons.

EXAMPLE 2

Preparation of Polyether Polyol 2

In a reaction kettle, pentaerythrite was added as an initiator, the catalyst (KOH) which was 0.3% (w/w) of the mass of propylene oxide (PO) designed to be added was added, the reaction temperature was controlled to be about 110±5° C., the pressure was controlled to be lower than 0.15 MPa, the PO was fed, and the reaction was then carried out. After the completion of the PO feeding, the reaction continued for 2 hours, and the unreacted PO was removed for 1 hour. After the completion of degassing, ethylene oxide (EO) was fed, and with the reaction temperature controlled at about 110±5° C. and the pressure controlled to be lower than 0.15 MPa, the reaction was carried out. After the completion of material feeding, the reaction was continued for 2 hours, and unreacted EO was removed for 1 hour. At this time, the reaction stage ended. With the temperature controlled to be at 85° C. to 90° C., soft water and phosphoric acid were added to neutralize the reaction product, and the neutralized product was dehydrated, filtered, and cooled to obtain the polyether polyol 2. In this example, the mass ratio of pentaerythrite/EO/PO was 1.36/14.80/83.84. The hydroxyl value of the obtained polyether polyol 2 was measured to be about 22 mgKOH/g, and the molecular weight was about 10000 daltons.

The reactions in the following examples were carried out at atmospheric pressure if not specified otherwise.

EXAMPLE 3

Preparation of Macromonomeric Stabilizer 1

3000 g of polyether polyol 1, 45.8 g of trimesic acid, and 180 g of acetone were mixed homogeneously, warmed to 110° C., and stirred and refluxed for 18 hours. 6.0 g of ethyl triphenyl phosphonium iodide was added and stirred to dissolve, and then 80.6 g of glycidyl methacrylate and 1.78 g of hydroquinone were added and reacted at 120° C. overnight to obtain a product as a transparent light-yellow liquid. After the solvent was removed, the product had a viscosity of 1720 mPa·s (25° C.).

EXAMPLE 4

Preparation of Macromonomeric Stabilizer 2

250 g of polyether polyol 2 and 12.5 g of hydrogenated maleopimaric acid (preliminarily dissolved with 50 g of acetone) were mixed homogeneously and heated to 100 ° C., 0.02 g of KOH was added, and then the above mixture was reacted for 4 hours. 0.59 g of tetrabutyl phosphonium bromide was added and stirred to dissolve, then 7.96 g of glycidyl methacrylate was added, and the above mixture was reacted at 120° C. for 6 hours. The acetone was removed to obtain a product as a transparent light-yellow liquid having a viscosity of 1800 mPa·s (25° C.).

EXAMPLE 5

Preparation of Macromonomeric Stabilizer 3

3000 g of polyether polyol 1 and 44.7 g of trimellitic anhydride were mixed homogeneously, heated to 120° C., and then reacted for 18 hours. 6.0 g of ethyl triphenyl phosphonium iodide was added and stirred to dissolve, then 80.6 g of glycidyl methacrylate was added, and the above mixture was reacted at 120° C. overnight to obtain a product as a transparent light-yellow liquid having a viscosity of 1600 mPa·s (25° C.).

Comparative Example 1

Preparation of Comparative Stabilizer 3000 g of polyether polyol 1 and 30.6 g of maleic anhydride were heated to 120° C. and then reacted for 12 hours. 50 g of ethylene oxide (EO) was then added, and then the reaction was continued for 4 hours. Unreacted EO was removed to obtain a product as a transparent brown-yellow liquid having a viscosity of 5500 mPa·s (25° C.).

It can be seen from Examples 3 to 5 and Comparative Example 1 that with the use of the same polyether polyol as the starting material, the preparation method of the macromonomeric stabilizer provided by the present disclosure can prepare a macromonomeric stabilizer whose viscosity (lower than 4000 mPa·s) was much lower than the viscosity of the macromonomeric stabilizer prepared by the prior art method.

EXAMPLE 6

Preparation of Polymeric Polyol 1

A 500 ml four-necked bottle provided with a stirrer, a heating device, a temperature control device, and a feeder was used as the reactor. 55.4 g of base polyether polyol (Wanhua WANOL® F3156, hydroxyl value: 54 mgKOH/g to 58 mgKOH/g, functionality: 3) and 5.6 g of macromonomeric stabilizer 1 were added to the reactor. The reaction system was stirred and slowly warmed to 110° C. A mixed liquid of 10.47 g of isopropanol, 85.71 g of base polyether polyol WANOL® F3156, 46.55 g of acrylonitrile, 69.83 g of styrene, and 1.21 g of azobisisobutyronitrile was continuously fed into the reactor within 100 minutes using a peristaltic pump. The temperature was maintained at 115° C. to 120° C., and after the completion of the feeding, the reaction was continued for 1 hour. The temperature was raised to 160° C., and the volatile organic compound (VOC) was removed in vacuo for 2 hours to obtain the polymeric polyol 1. After the index measurement, the residual styrene, acrylonitrile, and isopropanol in the obtained polymeric polyol 1 were 2 ppm, 2 ppm, and 4 ppm, respectively, and the hydroxyl value, solid content, and viscosity of the obtained polymeric polyol 1 were 29.8 mgKOH/g, 44.6% and 5049 mPa·s (25° C.), respectively.

EXAMPLE 7

Preparation of Polymeric Polyol 2

A 500 ml four-necked bottle provided with a stirrer, a heating device, a temperature control device, and a feeder was used as the reactor. 55.4 g of base polyether polyol (Wanhua WANOL® F3156, hydroxyl value: 54 mgKOH/g to 58 mgKOH/g, functionality: 3) and 5.6 g of macromonomeric stabilizer 3 were added to the reactor. The reaction system was stirred and slowly warmed to 110° C. A mixed liquid of 10.47 g of isopropanol, 85.71 g of base polyether polyol WANOL® F3156, 46.55 g of acrylonitrile, 69.83 g of styrene, and 1.21 g of azobisisobutyronitrile was continuously fed into the reactor within 100 minutes using a peristaltic pump. The temperature was maintained at 115° C. to 120° C., and the reaction was continued for 1 hour. The VOC was removed in vacuo for 2 hours to obtain the polymeric polyol 2. After the index measurement, the residual styrene, acrylonitrile, and isopropanol in the obtained polymeric polyol 2 were 2 ppm, 1 ppm, and 3 ppm, respectively, and the hydroxyl value, solid content and viscosity of the obtained polymeric polyol 2 were 30.4 mgKOH/g, 44.5% and 4998 mPa·s (25° C.), respectively.

Comparative Example 2

Preparation of Comparative Polymeric Polyol

A 500 ml four-necked bottle provided with a stirrer, a heating device, a temperature control device, and a feeder was used as the reactor. 55.4 g of base polyether polyol (Wanhua WANOL® F3156, hydroxyl value: 54 mgKOH/g to 58 mgKOH/g, functionality: 3) and 5.6 g of the comparative stabilizer prepared in Comparative Example 1 were added to the reactor. The reaction system was stirred and slowly warmed to 110° C. A mixed liquid of 10.47 g of isopropanol, 85.71 g of base polyether polyol WANOL® D3156, 46.55 g of acrylonitrile, 69.83 g of styrene, and 1.21 g of azobisisobutyronitrile was continuously fed into the reactor within 100 minutes using a peristaltic pump. The temperature was maintained at 115° C. to 120° C., and the reaction was continued for 1 hour. The VOC was removed in vacuo for 2 hours to obtain the comparative polymeric polyol. After the index measurement, the residual styrene, acrylonitrile, and isopropanol in the obtained comparative polymeric polyol were 2 ppm, 3 ppm, and 6 ppm, respectively, and the hydroxyl value, solid content, and viscosity of the obtained comparative polymeric polyol were 29.2 mgKOH/g, 45.0% and 5783 mPa·s (25° C.), respectively.

EXAMPLE 8

Polymeric polyols prepared in Examples 6 and 7 and Comparative Example 2 were subjected to the scanning electron microscope test (SEM Test).

The polymeric polyols 1 and 2 prepared in Examples 6 and 7 and the comparative polymeric polyol prepared in Comparative Example 2 were placed in a test tube, respectively, and heated to 150° C. which was maintained for 2 hours and then cooled. After the above materials were washed with ethanol and centrifuged, the solids were collected separately and then subjected to the SEM test (SEM model: Hitachi SU8010).

Figure 2:
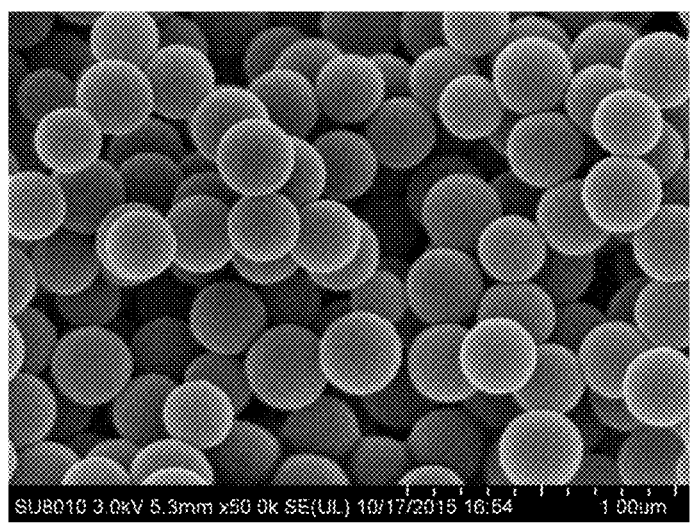
FIG. 2 is the SEM image of the polymeric polyol 2 prepared in Example 5.
Figure 3:
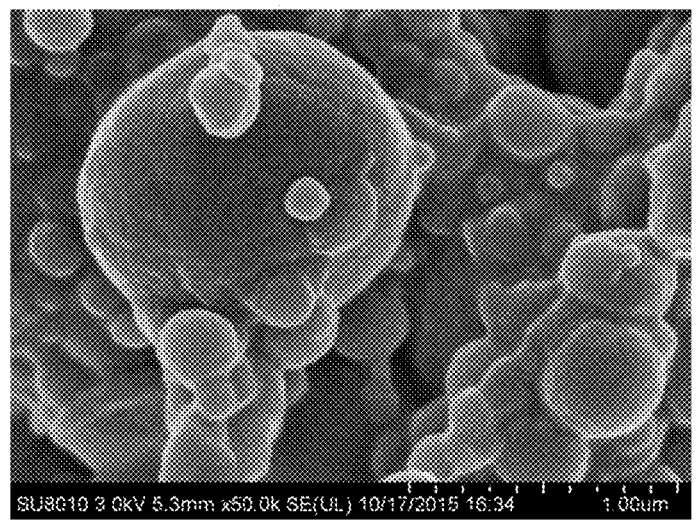
FIG. 3 is the SEM image of the comparative polymeric polyol prepared in Comparative Example 2.

SEM images of the polymeric polyols 1 and 2 and the comparative polymeric polyol are shown in FIGS. 1 to 3, respectively. It can be seen from FIGS. 1 to 3 that the polymeric polyol prepared according to the present disclosre had better thermal stability and showed no significant change in the particle appearance at high temperatures.

What is claimed is:

1. A method for preparing a macromonomeric stabilizer, comprising:
reacting a polyol with a tricarboxylic acid not comprising a polymerizable olefinic unsaturated double bond or a derivative thereof, to form an adduct; and
reacting the resulting adduct with an epoxide comprising a polymerizable olefinic unsaturated double bond;
wherein the structure formula of the tricarboxylic acid not comprising a polymerizable olefinic unsaturated double bond or the derivative thereof is

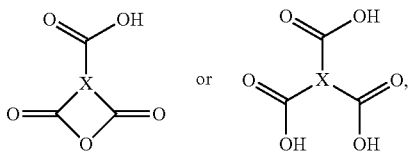

wherein X is a straight or branched alkane segment having 1 to 25 carbons; a cycloalkane segment having a total of 3 to 25 carbons; a straight or branched alkane segment containing cycloalkyl and having a total of 4 to 25 carbons; a cycloalkane segment substituted with straight or branched alkyl and having a total of 4 to 25 carbons; or a straight or branched alkane segment containing aryl and having a total of 7 to 25 carbons; and X does not comprise a polymerizable olefinic unsaturated double bond;
wherein the polyol is a polyether polyol.

2. The method according to claim 1, wherein the tricarboxylic acid not comprising a polymerizable olefinic unsaturated double bond or the derivative thereof is hydrogenated maleopimaric acid.

3. The method according to claim 1, wherein the epoxide comprising a polymerizable olefinic unsaturated double bond is one or more of 1,2-epoxides comprising a

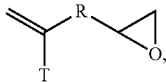

polymerizable olefinic unsaturated double bond, having a structure formula of
wherein R is selected from $R_1$—COO—$R_2$, $R_3$—O—$R_4$, or a straight or branched alkyl having 1 to 4 carbons, wherein $R_1$, $R_2$, $R_3$, and $R_4$ are each independently selected from H, or a straight or branched alkyl having 1 to 4 carbons; and
T is selected from H, cyano, or branched or straight alkyl having 1 to 4 carbons.

4. The method according to claim 1, wherein the molar ratio of the polyol to the tricarboxylic acid not comprising a polymerizable olefinic unsaturated double bond or the derivative thereof is 0.2:1 to 4:1.

5. The method according to claim 1, wherein the molar ratio of the tricarboxylic acid not comprising a polymerizable olefinic unsaturated double bond or the derivative thereof to the epoxide is 0.1:1 to 2:1.

6. The method according to claim 1, wherein the reaction of forming the adduct is carried out in the presence of a catalyst.

7. The method according to claim 1, wherein the reaction between the adduct and the epoxide comprising a polymerizable olefinic unsaturated double bond is carried out in the presence of a catalyst.

8. The method according to claim 1, wherein the reaction between the polyol and the tricarboxylic acid not comprising a polymerizable olefinic unsaturated double bond or the derivative thereof is carried out in a solvent-containing system.

9. A macromonomeric stabilizer prepared by the method according to claim 1.

10. A flexible polyurethane foam obtained by foaming a composition of a polyisocyanate and the polymeric polyol, wherein the polymeric polyol is prepared by a method comprising the following steps:
polymerizing at least one olefinic unsaturated monomer in the presence of a base polyether polyol, a polymerization initiator, and a macromonomeric stabilizer prepared by the method according to claim 1.

11. The flexible polyurethane foam according to claim 10, wherein the olefinic unsaturated monomer is one or more selected from aliphatic conjugated diene, a vinyl aromatic compound, α,β-olefinic unsaturated nitrile, α,β-olefinic unsaturated nitrile amide, α,β- olefinic unsaturated carboxylic acid, α,β-olefinic unsaturated carboxylate, vinyl ester, vinyl ether, vinyl ketone, a vinyl halide, and a vinylidene halide.

12. The flexible polyurethane foam according to claim 10, wherein the mass of the olefinic unsaturated monomer is 20% (w/w) to 70% (w/w) of the total mass of the base polyether polyol, the olefinic unsaturated monomer, and the macromonomeric stabilizer.

13. The flexible polyurethane foam according to claim 10, wherein the mass ratio of the olefinic unsaturated monomer to the base polyether polyol is 0.1:100 to 250:100.

14. The flexible polyurethane foam according to claim 10, wherein the base polyether polyol is a trifunctional polyether polyol having a hydroxyl value of 10 mgKOH/g to 60 mgKOH/g.

15. The flexible polyurethane foam according to claim 10, wherein by mass, the amount of the macromonomeric stabilizer is 0.3% to 10% of the total mass of the base polyether polyol and the olefinic unsaturated monomer.

16. The flexible polyurethane foam according to claim 10, wherein by mass, the amount of the macromonomeric stabilizer is 2% to 5% of the total mass of the base polyether polyol and the olefinic unsaturated monomer.

17. The flexible polyurethane foam according to claim 11, wherein the base polyether polyol is a trifunctional polyether polyol having a hydroxyl value of 10 mgKOH/g.

18. The flexible polyurethane foam according to claim 11, wherein the base polyether polyol is a trifunctional polyether polyol having a hydroxyl value of 10 mgKOH/g to 60 mgKOH/g.

* * * * *